July 22, 1958 A. H. ROSENTHAL 2,844,648
SCANNING MIRROR
Filed April 23, 1954

INVENTOR
ADOLPH H. ROSENTHAL
BY
Mitchell & Bechert
ATTORNEYS

United States Patent Office 2,844,648
Patented July 22, 1958

2,844,648

SCANNING MIRROR

Adolph H. Rosenthal, Forest Hills, N. Y., assignor to Fairchild Camera and Instrument Corporation, Syosset, N. Y., a corporation of Delaware Application April 23, 1954, Serial No. 425,242

3 Claims. (Cl. 178—7.1)

This invention relates to flying-spot scanners of the type in which scanning is achieved by purely mechanical manipulation of optical elements.

It is an object of the invention to provide an improved scanner of the character indicated.

It is a specific object to provide an improved optical scanner inherently lending itself to continuous scanning with 100 percent efficiency, that is, with no dead time occasioned by time required for a mirror surface fully to intercept an incident bundle of rays.

Other objects and various further features of novelty and invention will be pointed out or will occur to those skilled in the art from a reading of the following specification in conjunction with the accompanying drawings. In said drawings, which show, for illustrative purposes only, a preferred form of the invention:

Figure 1:
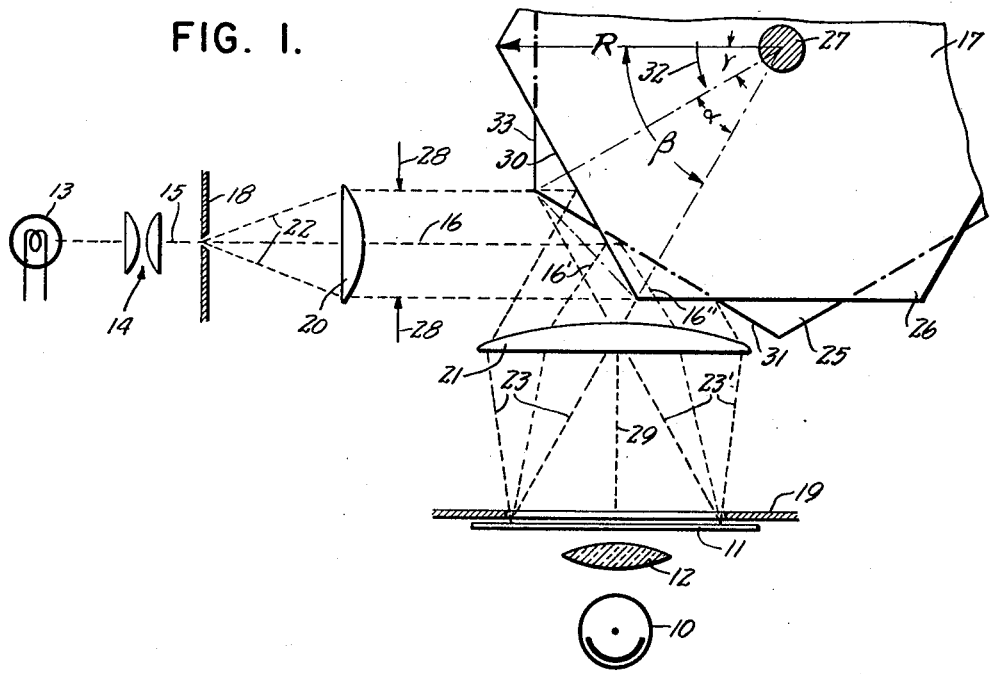
Fig. 1 is an optical diagram schematically illustrating geometrical relationships in a structure incorporating features of the invention.

Briefly stated, the invention contemplates a particular utilization of two interconnected and staggered regular mirror polygons whereby there may be 100 percent utilization of time, that is, effectively continuous devotion to transverse scanning of a line or field to be scanned. The arrangement is such that, while a mirror surface of one polygon is sweeping the scanning spot across the field with uniform response to a bundle of rays incident thereon, an adjacent mirror of the other polygon is introducing itself into the field of a like bundle of rays. By the time the first mirror has completed its sweep of the field, the second mirror has fully introduced itself into its bundle of rays and is able to commence a uniform sweep of the spot across the same field. No time need be lost upon transfer from one mirror to the next adjacent mirror in order to achieve successive spot scans. In the specific form to be described, a first optical slit in located on one side of the axis folded by the mirrors, and a second optical slit is located on the other side of said axis and oriented in a sense generally transverse to that of the first slit. Focusing optics on said axis and interposed between both slits serves to image one of the slits on the plane of the other of the slits through the mirrors of the polygons.

Referring to the drawings, the invention is shown in application to means for developing in a photoelectric cell 10 a video signal representative of successive line scans by a flying spot across a transparency 11 of variable density. The transparency 11 may be a fixed slide or a motion-picture film supported for transverse movement, as when desired to develop a frame of video intelligence; in the sense contemplated in the drawings, such transverse movement would be out of the plane of the paper. Optical means 12 are shown for directing light of varying intensity developed as the flying spot scans the transparency 11 into the cell 10.

The flying spot may be derived from light of uniform intensity originating at a lamp 13, followed by condenser means 14 located on an optical axis 15; said axis may be said to have a fixed or input part 16, and a deflected or output part swept between the limits 16'—16" as a result of folding achieved by a rotating mirror polygon 17. The spot itself may be defined by two crossed slits or diaphragms 18—19 intercepting the respective parts 16 and 16'—16" of the optical axis, and focusing optics 20—21 interposed between the slits may serve to image one slit on the plane of the other slit, as suggested by converging bundles of rays 22 (on the entrance side of the polygon) and 23—23' (on the exit side of the polygon). It is preferred that the focusing optics 20—21 shall be such as to establish collimated rays in the region folded by the mirrors of polygon 17, thereby assuring uniform spot focus across the slit 19, as more fully explained in copending patent application Serial No. 425,916, filed April 27, 1954, of A. H. Rosenthal and L. Levi.

Figure 2:
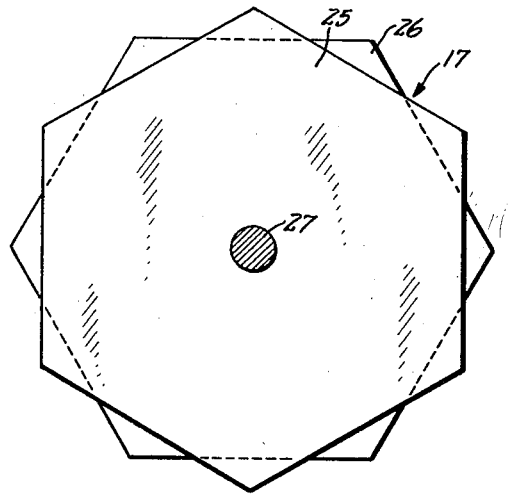
Fig. 2 is an end elevation of the polygon mirror shown in Fig. 1.
Figure 3:
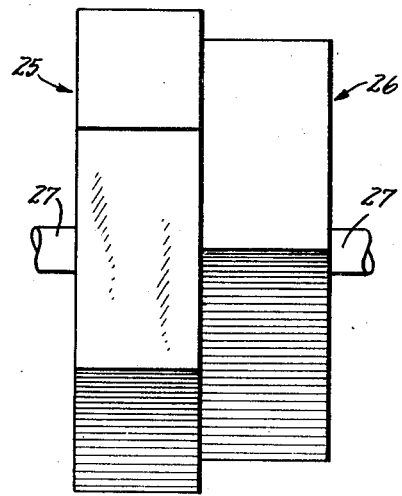
Fig. 3 is a side elevation of the mirror of Fig. 2.

In accordance with the invention, effectively continuous flying-spot scanning is achieved by constructing the polygon 17 as a composite polygon consisting of two single-mirror polygons in side-by-side adjacency, as shown more clearly in Figs. 2 and 3. The two single-mirror polygons are assembled coaxially and one turned in respect to the other by half the central angle of one face. That is, two polygons of $n$ faces each are assembled with an angular turn of $$\frac{1}{2}\left(\frac{360°}{n}\right)$$

or $$\left(\frac{180°}{n}\right)$$

and are then optically equivalent, but superior in performance to a polygon of $2n$ faces.

The principles of the invention apply whatever the number of sides chosen for the polygons, but, in the form shown, each polygon 25—26 is hexagonal, forming a 12-sided composite polygon, and the mirror surfaces of these polygons are equally staggered with respect to each other about a common axis. Drive means, not shown, may be provided for continuously rotating the double polygon 25—26, and the necessary support is merely suggested by shaft means 27.

By suitably proportioning the aperture, that is, the effective span or width of the bundle of collimated rays on the fixed half 16 of the optical axis (as suggested by the stop 28), with respect to the maximum radial extent R of the double polygon 17, this full aperture may be utilized at all times so as to produce reflected, uniformly intense bundles of collimated light throughout the scan between axis limits 16' to 16", regardless of the particular mirror surface responsible for such reflection. For the case shown, the aperture at 28 is preferably at most substantially $$2R \sin \frac{\alpha}{2} \cos \gamma$$

where R is the maximum radial extent of the polygons, $\alpha$ is the scanning angle, and $\gamma$ is the half angle of deflection of the optical axis ($\gamma=45$ degrees for the 90-degree deflection shown). For the more general case (i. e. discontinuous scanning), the aperture at 28 is given as $$2R \sin \frac{\beta-\alpha}{2} \cos \gamma$$

where $\beta$ is the angle subtended by a polygon face.

On the folded or moving half of the optical axis, as represented between limiting axes 16' and 16", the aperture of collimating lens 21 is necessarily wider than at 28 on the fixed half 16 of the optical axis. This aperture must, of course, be sufficient to accommodate the full angular spread between limiting axes 16′—16″ in addition to substantially the projection of a full collimated beam width, as is evident from Fig. 1. Since symmetrical reflections are involved, the mean deflected or reflected axis 29 will be offset from the rotary axis 27 by the same extent as is the axis 16.

In operation, and beginning with the instant of time represented in Fig. 1, the reflecting surface 30 of the polygon 26 has just fully intercepted the complete bundle of incoming rays admitted by aperture 28. This bundle is reflected as collimated light on axis 16′ and focused by converging rays 23 as a spot at the left limit of the transparency or field 11. At this particular instant, the adjacent surface 31 has accommodated an equal number of rays from the aperture 28 for reflection on axis 16″ and for convergence by bundle 23′ to form a spot at the righthand limit of the transparency 11. For the direction of rotation represented by arrow 32, the spot formed by bundle 23′ is just being clipped by the righthand limit of slit 19 so as thereafter to allow only the spot developed by reflection from surface 30 to progress left to right across the transparency 11. Meanwhile, the next adjacent surface 33 of polygon 25 is entering the fixed bundle of collimated light on axis 16, and by the time surface 30 has swept its reflected bundle to the axis designated 16″, the new surface 33 will have fully intercepted the fixed bundle of collimated light, so as to commence another flying-spot scan at the left-hand extreme of the field. The cycle then repeats. One spot is seen to commence a scan immediately upon the completion of a scan by the previous spot, so that continuous scanning results.

It will be seen that a relatively simple structure has been disclosed for achieving continuous scanning. With this construction, a field may be more efficiently covered than would be possible with a single polygon of double the number of faces, and there is no need to resort to the complex manufacturing techniques required to produce a polygon of double the number of faces. With regard to polygon manufacture, it will be noted that, since all reflections involve the use of collimated light, the tolerance for radially spacing the reflecting surfaces from the axis of rotation may be relaxed considerably, the principal requirement being that the angular separation between polygon surfaces be constant and uniform.

While the invention has been described in detail for the preferred form shown, it will be understood that modifications may be made within the scope of the invention as defined in the claims which follow.

What is claimed is:

1. A flying-spot scanner, comprising two like regular polygon mirrors fixed in side-by-side adjacency with the surfaces of one polygon angularly symmetrically staggered with respect to the corresponding surfaces of the other polygon, the angle of displacement between corresponding faces of said polygons being one half the included angle subtended by a face of one of said polygons, means supporting said polygons for rotation about their common axis, an optical slit mounted offset from said mirrors and with a slit axis generally parallel to said rotary axis, a second optical slit mounted offset from said mirrors and with a predominant axis generally transverse to a plane including said axis of rotation, focusing optics including a first collimating lens focused on said first slit and establishing a collimated region between said first slit and mirror surfaces of both said polygons, and a second collimating lens responsive to reflected collimated light from mirrors of both polygons and imaging said first slit substantially in the plane of said second slit.

2. A scanner according to claim 1, and including a transparency of variable density supported adjacent said second slit, a source of light directed through said transparency at one of said slits, and photoelectric means located at the other of said slits and aligned for response to light passing through said transparency and through said slits.

3. A flying-spot scanner, comprising two like regular polygon mirrors in side-by-side adjacency and fixed with their reflecting surfaces in angularly symmetrically staggered relation on a common axis of rotation, the angle of displacement between corresponding faces of said polygons being one half the included angle subtended by a face of one of said polygons, an optical axis folded by adjacent mirror surfaces of both polygons and including a stationary part and a moving part swept as the result of rotation of said polygons, collimating lenses focused on the fixed and stationary parts of said optical axis and establishing a collimated region in which said axis is folded by said mirror surfaces, the aperture of the collimated bundle of said stationary part being at most $$2R \sin \frac{\beta - \alpha}{2} \cos \gamma$$

where R is the maximum radial extent of said polygons, where $\alpha$ is the scanning angle, $\beta$ is the angle subtended by the polygon face at the polygon center, and $\gamma$ is the half angle of deflection of the optical axis.

References Cited in the file of this patent

FOREIGN PATENTS 702,907    France _____ Feb. 2, 1931